Sept. 22, 1964   R. C. EHLERT   3,150,264
INFRARED REFLECTION AND ABSORPTION SYSTEM FOR MEASURING THE
QUANTITY OF A SUBSTANCE THAT IS SORBED IN A BASE MATERIAL
Filed Oct. 9, 1961   2 Sheets-Sheet 1

INPUT TO VARIABLE
GAIN AMPLIFIER

INPUT TO DEMODULATOR

INVENTOR.
RALPH C. EHLERT
BY Ralph D. Hohenfeldt
ATTORNEY

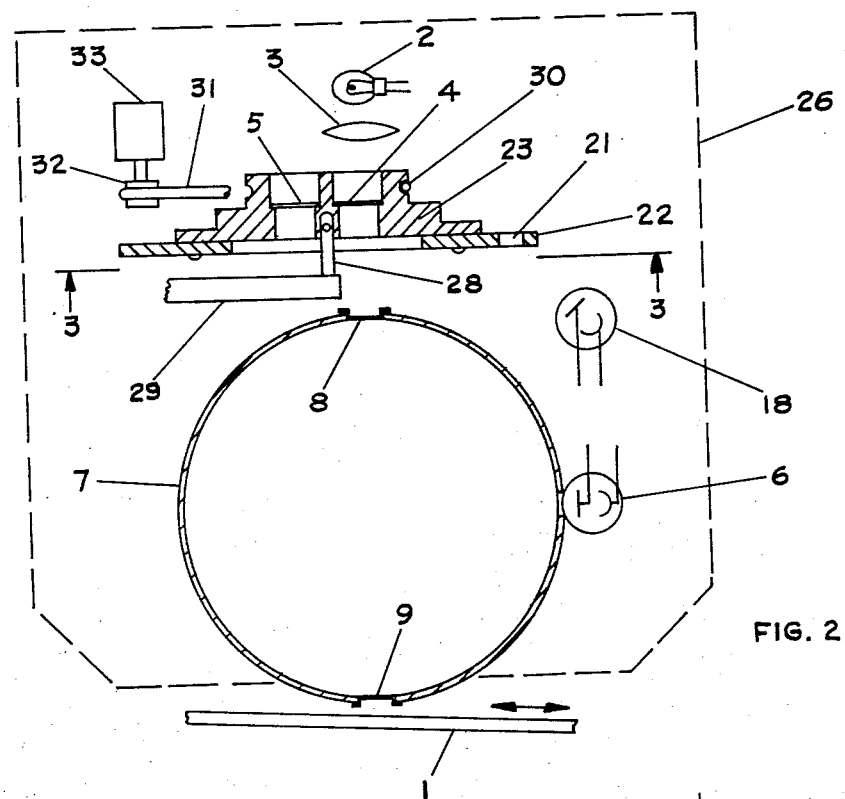
FIG. 2
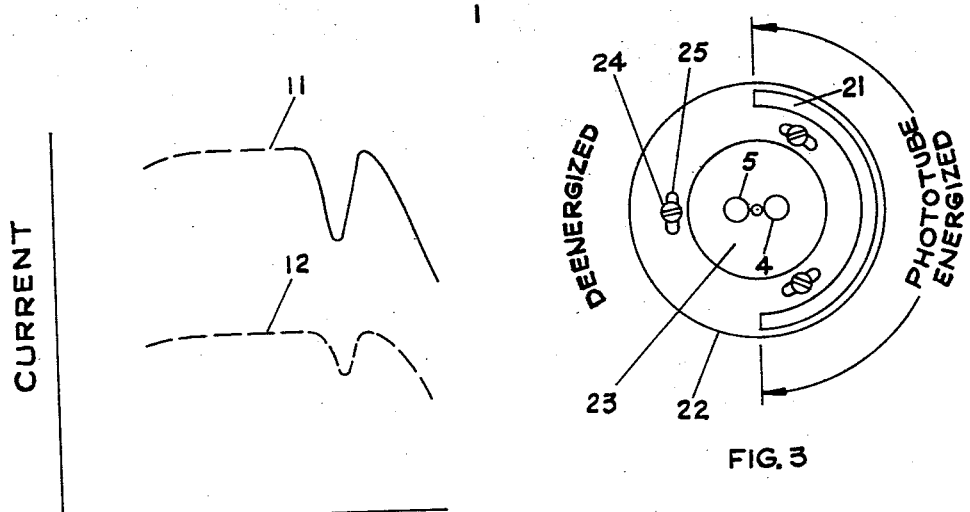
FIG. 3
FIG. 4
INVENTOR.
RALPH C. EHLERT
BY Ralph G. Hohenfeldt
ATTORNEY United States Patent Office 3,150,264
Patented Sept. 22, 1964

3,150,264
INFRARED REFLECTION AND ABSORPTION SYSTEM FOR MEASURING THE QUANTITY OF A SUBSTANCE THAT IS SORBED IN A BASE MATERIAL
Ralph C. Ehlert, Milwaukee, Wis., assignor to General Electric Company, a corporation of New York
Filed Oct. 9, 1961, Ser. No. 143,749
12 Claims. (Cl. 250—83.3)

This invention relates to a method and apparatus for gaging the amount of a substance in a base material through the use of infrared reflectance and absorption phenomena. An illustrative embodiment and the principles of the invention will be described in connection with continuously determining the amount of water in a moving sheet of material as is often desirable in the manufacture of paper.

Previous efforts to measure water and other fluids in paper and other material have involved attempting to co-ordinate beta ray attenuation, impedance or dielectric changes, or absorption of microwave energy with changes in content of the substance in the material. None of these has been successful to the extent that it has received widespread commercial acceptance.

Accordingly, an object of the present invention is to provide a better gage for measuring the quantity of fluid or other substance in another material.

Another important object is to provide a gage that does not contact the material.

Further objects are to provide a gage that is comparatively inexpensive, easy to operate, stable, accurate and adaptable to on-line processes and laboratory use, and which measures content of the substance over a wide range. A more specific object is the provision of a gage that employs infrared radiation absorption and reflectance phenomena.

Achievement of the foregoing and other more specific objects will appear from time to time throughout the course of the ensuing specification.

The present invention is characterized by projecting a radiation beam that includes the infrared spectrum onto a material such as paper in which there is a sorbed substance like water. A pair of dissimilar infrared monochromating devices are successively passed through the beam either before or after it is reflected by the material. Two wavelengths are monochromated. One lies in the absorption band of the substance and the other, a reference wavelength, lies outside of its absorption band. The wavelengths are not disproportionately affected by changes in the material itself. Through a suitable infrared sensing device, the radiation reflected by the material is then continuously detected to derive a pulsating electric signal. The amplitudes of the two components of this signal are proportional to the reflectance at the two wavelengths. The ratio of these amplitudes is an analog of the substance content.

The word substance as used herein refers to molecules that are bound in a base material and do not lose their identity. The word material refers to the matter on or in which the substance is bound so as to permit radiation to be reflected from it.

A more detailed description of the invention will now be set forth in conjunction with the drawings in which:

FIG. 2 is an elevational view of a sensing head employed in the gage, partly in section and partly schematic;

FIG. 3 is a plan view of a rotating filter assembly taken on a line corresponding with 3—3 in FIG. 2;

FIG. 4 is a curve showing the relationship between the output of a photosensitive device and wavelength of reflected radiation received by it; and, FIGS. 5 and 6 are curves illustrating signals obtained at various points in the system, for facilitating explaining the invention.

Figure 1:
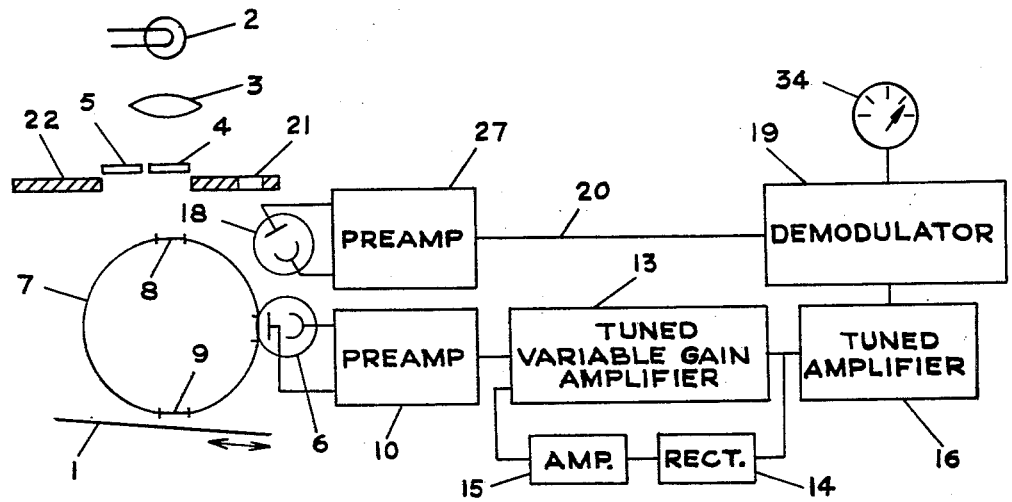
FIG. 1 is an illustrative schematic representation of a gage for measuring a substance in a fluid or solid material.

Attention is now invited primarily to FIG. 1 where there is seen a sheet of wet material 1 which may be traveling at high speed generally in the direction of the adjacent arrow as in a paper making machine. Remote from the paper 1 is a source of radiation illustrated as an incandescent lamp 2 having a continuous spectral output distribution that includes the infrared band. Radiation from lamp 2 is collimated by a lens 3 which projects a parallel beam of rays, both visible and invisible, normal to the plane of a pair of narrow band-pass interference filters 4 and 5. Filter 4 is shown in the beam but both filters are adapted to orbit at 600 r.p.m., so that they are alternately presented to the beam in quick succession for developing individual pulses of radiation reflected by the paper at a corresponding frequency which would be 10 cycles per second in this example.

The pulsed reflected radiation from paper 1 is detected by a photosensitive device like a lead sulphide photocell 6 that is directed into an integrating sphere 7. The beam that is incident to the paper from each filter first passes through an infrared transmissive window 8 at the top of sphere 7 and then through a diametrically opposite, preferably larger window 9 at the bottom. Alternate beams, after striking paper 1 are diffusely reflected through bottom window 9 where the rays are intercepted by the interior surface of the sphere and reflected back and forth so that uniform distribution of the radiation results. Photosensitive device 6 converts the radiation pulses of alternately different intensity into corresponding electric pulses that are fed into a pre-amplifier 10. The pulses are further treated to develop a direct current output signal corresponding with the water content as will be explained more fully later.

It will be evident to those versed in the art that filters 4 and 5 may also be located in the radiation path intermediate the reflecting paper 1 and photosensitive device 6.

Filters 4 and 5 are selected according to the different wavelengths or spectral bands which each of them is required to pass. This depends upon the nature of the material and the substance. In this example, we may assume that the amount of sorbed water in paper is being determined, in which case filter 4 is preferably one that has a band-pass center at 1.94 microns which is a wavelength among several in the spectrum at which there are strong absorption bands or where pronounced changes in reflectance of infrared radiation by water in paper occurs. Some tolerance in the value of the center of the band-pass of the filter exists since good results were obtained with a filter whose band-pass center was at 1.91 microns and whose band width at half maximum amplitude of the peak was .08 micron, which means that the filter merely reduced the intensity of the essentially 1.94 micron wavelength of interest. A wavelength of around 2.67 microns may also be used in some instances where paper moisture measurement is involved.

Filter 5, which passes only the reference radiation wavelength, is chosen so that the band it passes is wholly outside the absorption band of filter 4 or any other absorption band for the fluid. A reference wavelength of 1.63 microns has been found most satisfactory for measuring water in paper. Other wavelengths suitable for a reference because they are not affected by water variations may be found near 1.0, 1.2 and 2.2 microns.

Radiation at wavelengths of 1.94 and 1.63 microns is intercepted by photocell 6 in pulses, due to orbital travel of the filters 4 and 5, after being reflected by paper 1. The output of photocell 6 is in the form of a wave represented in FIG. 5. The first pulse, that may be representative of the radiation at 1.94 microns passing through filter 4 and reflected by the paper, is designated by 4a and it is seen to have a greater amplitude than the next wave 5a which represents the intensity of 1.63 micron radiation from reference filter 5. As shown, the pulse representative of the 1.94 micron radiation is larger than that representative of the 1.63 micron radiation because the incident intensity of the 1.94 micron radiation is greater than that of the 1.63 micron radiation. If the amount of water in the material is increased, pulse 4a would decrease in amplitude due to increased absorption, and a corresponding decrease in reflectance, while the height of pulses 5a remain essentially constant.

If the bias voltage on photocell 6 varies or if the intensity of the source 2 changes, the pulse heights would change together but maintain their same ratio. This is evident from FIG. 4 which shows how the photocell current varies with wavelength when infrared radiation is reflected by paper. Solid curve 11 represents the current output at one level of intensity. Throughout most of the spectrum it is seen that the current output is uniform. At around 1.94 microns, however, there is increased absorption by the water in the paper so reflectance, and correspondly, current output falls sharply. The depth of the inverse peak at the 1.94 micron absorption band is dependent upon the amount of water present in the material. The dashed line 12 shows how current output from the photocell 6 may fall, for example, when source intensity drops. Even though curve 12 is at a different level than 11, there is still essentially the same relative change in photocell output at 1.94 microns as compared with the reference wavelength of 1.63 microns. This means that there remains the same ratio of the peak amplitudes of pulses 4a and 5a in FIG. 5 if the amount of water present remains constant. It is seen that the amplitude of pulses 4a, that depend upon reflectance of 1.94 micron radiation, varies with the change in water content and other factors, while the amplitude of alternate pulses 5a depends upon reflectance at the 1.63 micron reference wavelength and varies only with other factors. Hence, the effect of water content changes is determinable.

Figure 5:
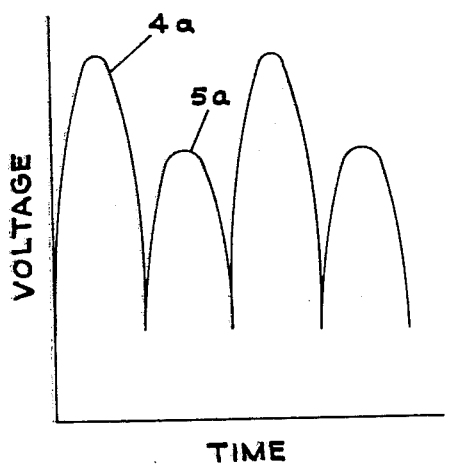

The alternating waveform shown in FIG. 5 is passed from photocell 6 to pre-amplifier 10 which also filters or smooths the wave to some extent. The output from pre-amplifier 10 is fed into a highly stable, tuned variable gain amplifier 13. The amplifier 13 electronically compensates for such variables as the intensity of the source 2, bias voltage on the photocell 6, and line voltage, by putting out a signal having a constant average value of 30 volts, in this instance. This method maintains constant differences between the peak amplitudes of pulses 4a and 5a of FIG. 5 at a constant ratio of amplitudes. Input levels of 0.2 to 10 volts are accepted by amplifier 13. The variable gain amplifier 13 is controlled by a feedback circuit that takes part of its output signal, rectifies it in 14, and amplifies it in 15.

Figure 6:
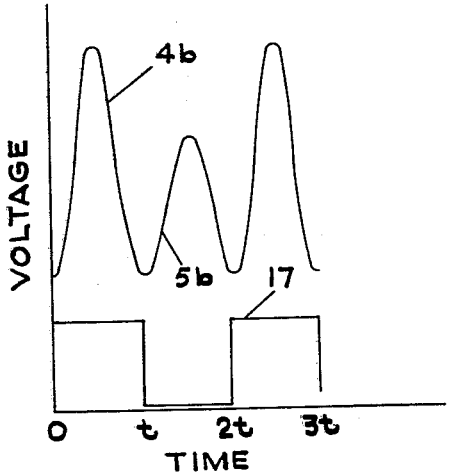

The output from the variable gain amplifier 13 is fed into a tuned amplifier 16 where the desired frequency component, which is the 10 cycles per second filter change frequency is amplified, resulting in the waveform appearing in FIG. 6. The waveform of FIG. 6 is fed into the demodulator 19 along with a reference signal derived from another photosensitive device such as photocell 18, see FIG. 1. Photocell 18 generates square wave pulses at a 10 cycle frequency. The shape of the reference pulses and their pulse relationship with respect to pulses 4b and 5b are also shown in FIG. 6 as curve 17. During the time interval from zero to $t$, the demodulator 19 integrates the area of pulse 4b. During the time interval from $t$ to $2t$, the demodulator integrates the area of the pulse 5b. To accomplish the aforegoing, the waveform of FIG. 6 is fed into the grid of a triode vacuum tube, not shown, whose plate resistor and cathode resistor are of equal value. The voltage across the plate resistor is 180° out of phase with the voltage across the cathode resistor. The reference signal 17, see FIG. 6, is used to activate a relay, not shown, which alternately switches the voltage appearing across the plate resistor and cathode resistor into a filtering network which averages the area of both of the components 4b plus the negative of 5b. A direct current output is obtained which is calibrated to indicate percent of moisture in the paper.

The square wave synchronizing signal fed into demodulator 19 on conductor 20 may be derived in a number of different ways. In the instant case photocell 18 is used. In FIG. 1, photocell 18 is located so as to intercept light from source 2 through a substantially semi-circular slot 21 in a disk 22 that rotates concurrently with filters 4 and 5. The relationship of slot 21 to filters 4 and 5 is best seen in FIG. 3 which shows a plan view of the disk 22. During one-half revolution of disk 22, photocell 18 is illuminated through slot 21. This may correspond with the period between ordinates zero and $t$ along the time axis in FIG. 6. Simultaneously, filter 4 may be transmitting. During the next half revolution, the light beam from source 2 to photocell 18 may be cut off by the imperforate portion of disk 22, at which time filter 5 is transmitting.

Disk 22 is concentric with a wheel 23 on which it is held by screws 24 passing through elongated slots 25. This construction enables adjusting disk 22 rotationally so that slot 21 cuts off the beam precisely when one of the filters is departing from and the other entering into the beam.

The construction of FIG. 3 is merely illustrative for the synchronizing signal may be developed in any suitable fashion. For instance, single holes may be located at each end of the arc defined by slot 21 so that a short pulse of light impinges on photocell 18, and from the corresponding pip developed, a multivibrator, not shown, or other similar device may be triggered to produce the electric pulse. Another alternative, not shown, is to mount a permanent magnet on wheel 23 so that it induces a voltage in a stationary coil by way of electromagnetic induction.

Some of the structural details of the apparatus will now be reviewed in reference to FIG. 2 which shows the sensing head of the device. This may be contained in a metal housing 26 which is shown by a broken line. Its configuration is a matter of design choice. The sensing head includes light source 2, collimating lens 3, filters 4 and 5, a wheel 23 on which they are mounted for orbital movement, synchronizing disk 22 and integrating sphere 7. Also included within housing 26 are the photosensitive devices 6 and 18. The pre-amplifiers 10 and 27 associated with devices 6 and 18 may also be located in the housing 26 if desired.

Wheel 23 may be secured to a shaft 28 that is journaled for rotation in any suitable means such as an arm 29. The arm and shaft are located so as to not interfere with the monochromatic infrared radiation passing through filters 4 and 5 on the way to window 8 in integrating sphere 7. Wheel 23 has a portion constituting a pulley in which there is a peripheral groove 30 for a round belt 31 which also surrounds a driving pulley 32 that is driven by a motor 33. In this case, the motor speed is chosen so that filters 4 and 5 orbit at 10 r.p.s. Those versed in the art will realize that rotational speed is dependent upon the parameters chosen for operation of the other electronic components in the system.

For convenience, photosensitive device 6 has been referred to as a lead sulphide photocell, but it may take other forms such as a bolometer, photovoltaic cell, other photoconductor, or any other device whose signal output varies in correspondence with the intensity of infrared radiation falling on its sensitive substance.

More than one photosensitive device like 6 may be used if they are paralleled. There is advantage in this when photoconductors are used because the signal to noise ratio is greater for larger area layers so that the effect of noise is reduced. Any photosensitive device used should have its sensitive element located in a position coincident with the interor surface of integrating sphere 7 so that the radiation it receives is maximized and coincides with that falling on other portions of the sphere's interior.

Integrating sphere 7 may be a thin shell of spun aluminum whose interior surface is roughened by grit blasting in order that it diffuse any radiation received by its interior and reflect it back and forth a large number of times. The inlet window 8 receiving the parallel beam of infrared radiation from filters 4 and 5, may be any infrared transmissive substance such as glass or a thin film of polyethylene. The object in any case is to minimize attenuation of the beam as it passes through a similar exit window 9 for the primary radiation. Inlet window 8, in a practical embodiment was ¾" in diameter and the exit window 9 was 1½" in a 6½" inside diameter integrating sphere 7.

Window 9 also constitutes an inlet for radiation diffusely reflected from the surface of paper 1 which may be traveling at as high as 2500 feet per minute. It will be observed that the plane of paper 1 may be slightly inclined to the incident beam so that the possibility is removed for directly reflected rays from the generally planar surface of paper 1 being returned along their original path back through inlet window 8. In other words, most of the total radiation reflected from the surface of paper 1 falls initially upon an area inside sphere 7 which does not include the area encompassed by window 8 and any directly reflected rays will have an angle of reflection causing them to fall next to inlet window 8. This contributes toward maximizing output signals. For narrow band-pass interference filters 4 and 5 other monochromating devices such as optical gratings, prisms, slits, or monochromatic reflectors may be used. The output signal from the system may be fed to any recording or control device or it may merely be observed on a meter such as 34.

The construction and operating principles of the apparatus have been described above primarily in connection with determining fluid content in paper. This is a choice for convenient exemplification since the invention has many uses. Determining the content of a fluid like water in other organic or cellulosic materials is another. In measuring water in cotton textile materials, for instance, good results were achieved with the same apparatus using 1.94 micron infrared radiation as that affected by water content variations and using 1.63 micron infrared radiation as a reference radiation. Of course, other pairs of spectral bands mentioned earlier may also be used where measurement of water is desired, and in any case, where various substances are to be measured in various materials, those versed in the art will select the proper combination of spectral bands to suit the substance and material.

Although the principles of the invention have been described in connection with particular apparatus and circuitry, and describing specific uses has been undertaken- it will be understood that such description is illustrative rather than limiting, for the invention may be variously embodied and adapted for measuring different substances in different materials. Therefore, its scope is to be determined by interpretation of the claims which follow.

It is claimed:

1. Apparatus for measuring the amount of a substance that is sorbed by a solid material comprising:
   (a) a radiation source that emits predetermined infrared spectral bands of radiation that impinge on the material and are reflected therefrom,
   (b) one spectral band being characterized by it lying outside any absorption band of the substance and by it being reflected without being substantially affected by the amount of substance present,
   (c) the other spectral band being characterized by it lying within a resonant absorption band of the substance being measured and by it being reflected and absorbed in accordance with the amount of the substance sorbed by the solid material,
   (d) detector means that are responsive to the intensities of the spectral bands which are reflected from the material by producing an electric signal that depends on the amount of the substance which is present, and
   (e) means interposed in the radiation path between the source and detector means for selecting the infrared spectral bands intercepted by the detector means.

2. The invention set forth in claim 1 wherein said material is solid and said substance is water and the radiation that lies within an absorption band of the substance is essentially 1.94 microns in wavelength.

3. The invention set forth in claim 1 wherein said substance is water and said material is paper and the radiation absorption band of the substance lies between wavelength limits of 1.88 and 1.99 microns.

4. The invention set forth in claim 1 wherein said substance is water and said material is paper and the radiation which lies outside the absorption band of the substance and whose reflectance is relatively unaffected by the amount of the substance is selected from the group consisting of essentially of 1.0, 1.2, 1.5 to 1.7 and 2.2 microns wavelength.

5. Apparatus for measuring the amount of a substance that is sorbed in a solid material comprising a radiation source that emits infrared radiation including wavelengths lying within desired infrared spectral bands for impingement on the material, the reflectance of one of the bands being affected by the amount of substance in the material and the reflectance of the other being relatively unaffected, detector means intercepting the reflected radiation and developing consecutive pulsating electric signals proportional to the intensity of radiation reflected at each wavelength band, means for developing another signal dependent upon the ratio between said signals which other signal corresponds with the amount of the substance, and means interposed between said source and said detector means for selecting the infrared radiation bands intercepted by the detector means.

6. Apparatus for measuring the amount of a substance that is sorbed in a solid material comprising a radiation source that emits infrared radiation including wavelengths lying within desired spectral bands for impingement on the material, the reflectance of one of the bands being affected by the amount of substance in the material and the reflectance of the other being relatively unaffected, detector means intercepting the reflected radiation and developing pulsating electric signals proportional to the intensity of the radiation reflected at each wavelength band, means for developing another signal that is dependent upon the signals from the individual wavelength bands, and means interposed between said source and detector means for selecting the infrared radiation bands intercepted by the detector means.

7. Apparatus for measuring the amount of a substance that is sorbed in a solid material comprising a source emitting radiation including desired infrared wavelength bands for impingement on the material, the reflectance of one of said bands being affected inversely with the amount of substance present in the material and the other being relatively unaffected thereby, detector means, at least two narrow band-pass filter means and means for alternately interposing said filter means in the path between said source and detector means, said detector means being adapted to develop electric signals whose magnitudes are respectively proportional to the intensity of radiation reflected at each band, and means for developing another signal dependent upon said first signals and corresponding with the amount of sorbed substance in the solid material.

8. The invention set forth in claim 7 wherein said filter means are interposed intermediate said source and said material.

9. The invention set forth in claim 7 wherein said filter means are interposed intermediate said material and said detector means.

10. The invention set forth in claim 7 including a hollow integrating sphere means having opposed openings for transmitting radiation therethrough to said material and for receiving through one of said openings radiation reflected by said material, said filter means being interposed between said source and sphere means and said detector means being disposed to receive radiation substantially at the surface inside the sphere means.

11. Apparatus for measuring the amount of a substance in a material comprising a source of radiation including desired infrared wavelength bands for impingement on the material, radiation detector means, at least a pair of dissimilar narrow band-pass filter means mounted for being alternately passed through the radiation path between said source and detector means, the radiation of one of said bands being reflected by the material and substance in accordance with the amount of the substance present, the other of said bands being relatively unaffected thereby, said detector means being adapted to develop alternating electric signals whose respective amplitudes depend upon the intensity of each radiation band reflected, means for referring said signals to a fixed reference level, and means for demodulating said signal at the reference level to produce another signal whose magnitude is proportional to the amount of the substance present.

12. The invention set forth in claim 11 including driven means on which said filter means are mounted for orbiting through said radiation path, means for developing a signal indicative of the angular position of the filters, said last named signal synchronously controlling said demodulating means.

References Cited in the file of this patent

UNITED STATES PATENTS

| | | |
|---|---|---|
| 2,442,910 | Thompson | June 8, 1948 |
| 2,481,034 | Neufeld | Sept. 6, 1949 |
| 2,856,811 | Kaye | Oct. 21, 1958 |
| 2,868,062 | Haley | Jan. 13, 1959 |
| 2,936,886 | Harmon | May 17, 1960 |
| 3,030,512 | Harker | Apr. 17, 1962 |